June 2, 1931.    W. H. JACKSON    1,808,353
AGITATOR
Filed June 21, 1927
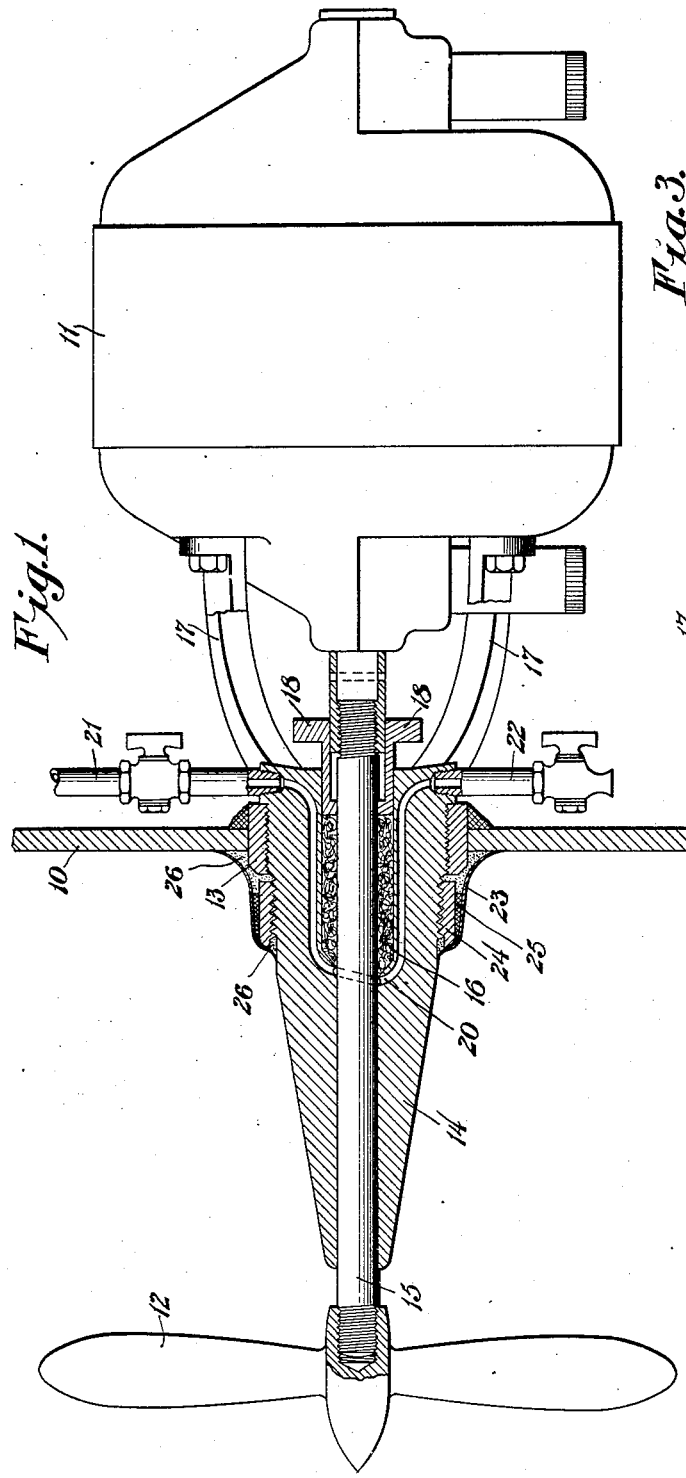
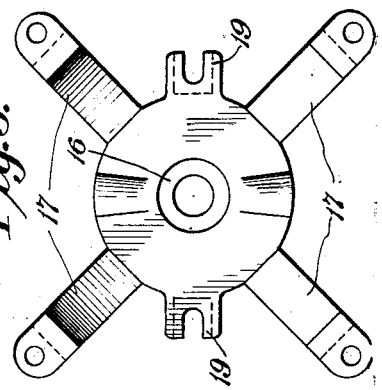
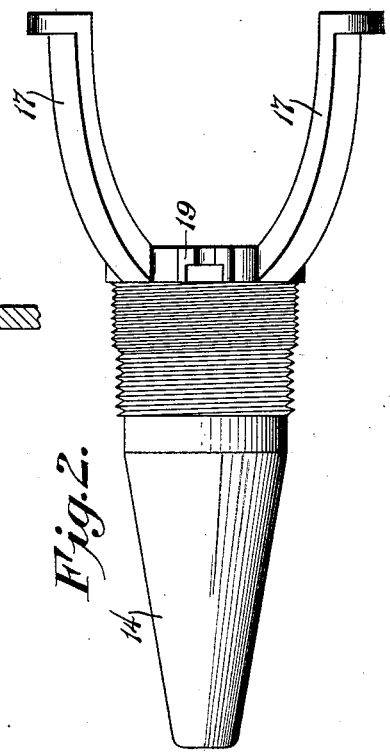
INVENTOR
William H. Jackson
BY
*Alva D. Adams*
ATTORNEY Patented June 2, 1931

1,808,353

UNITED STATES PATENT OFFICE

WILLIAM H. JACKSON, OF DOUGLASTON, NEW YORK

AGITATOR

Application filed June 21, 1927. Serial No. 200,483.

This invention relates to agitators and aims, among other objects, to provide improved means to facilitate securing an agitator unit to a tank or container and to prevent misalignment and wear of shaft and bearings.

In the drawings:

Fig. 1 is a side elevation partly in section, showing an agitator embodying the invention;

Fig. 2 is a side elevation of a shaft bearing and supporting element shown in Fig. 1; and Fig. 3 is a right hand end view of Fig. 2.

Referring particularly to the drawings, the improved agitator there shown is connected to the wall 10 of a container being driven by a small motor 11 on the outside of the container and having a propeller 12 on the inside.

The present improvement has to do mainly with the bearing whereby the drive shaft is supported in the wall of the container and arranged to be inserted therein from the outside. Herein, there is shown a threaded supporting sleeve 13 suitably secured by brazing or welding in an opening in the wall 10. In glazed containers such sleeves are usually put in before the glazing operation.

Instead of making the bearing for the shaft in several parts to be assembled from the inside of such containers which are hard to keep in alignment to receive the shaft, the bearing is shown as comprising an elongated bushing 14 threaded at one end to be screwed into the sleeve 13 and presenting an extension guide portion surrounding the shaft 15 to a point adjacent to the propeller. The shaft 15 may be connected directly to the shaft of the motor 11 by any suitable rigid connection.

Referring to Fig. 1, the right hand end of the bushing extending through the wall 10 is shown as being counterbored to provide a stuffing box 16 which forms a water-tight bearing portion for the shaft.

To support the motor with its shaft in alignment with the shaft opening in he bushing, supports 17 in the form of spider arms are cast integral with the bushing and may be machined and drilled so that each arm may be bolted to the motor casing through the openings usually provided for connecting the parts of the casing. Thus, the motor which may be quite small, is supported directly by the bushing.

In some cases the space between the container wall and a wall or floor of the building is quite limited. Hence, the arms 17 are short. This enables the installation to take up a minimum of floor space and relieves the bushing of strain due to the weight of the motor. In the present instance, the stuffing gland 18 is made in two duplicate parts adapted to be secured to the bushing by bolts inserted in notched ears or lugs 19 (Fig. 3). Thus, the gland may be removed entirely to afford access to the stuffing box without removing the whole bushing or the motor.

To permit the shaft guiding extension to be cleansed of contamination, there is shown a duct 20 for cleansing fluid to be forced around the shaft. Herein the valved inlet and outlet pipes 21 and 22 are connected to the duct. This cleaner is similar to that claimed in my copending application Serial No. 386,043, filed June 2, 1920.

In glass lined containers considerable difficulty has been experienced in making the joint between the securing sleeve and the inside of the glazed surface. In many cases the glaze is cracked around the sleeve due to slight differences in coefficients of expansion or to sudden changes in contents of the tank. Further, it has been found to be very difficult to glaze over a joint or crack between two parts. To avoid the necessity for applying the sleeves in glazed tanks before it is determined when the agitator will be installed, there is shown a shield 23 adapted to cover the joint. Herein, the shield is shown as being made of spun metal and having sharp edges to engage the bushing and the container wall, the shape being adapted to conform to the contour of the wall. Herein, the shield is secured to a ring nut 24 by any suitable means such as solder 25 and the nut is adapted to be screwed on the bushing. The threads for the nut are of greater pitch than those in the securing sleeve 13 so that, after the bushing is screwed part way in the sleeve, the nut may be held against rotation and started on its threads. It will force the shield against the wall and bend it slightly when the bushing is screwed home, due to the differential threads.

As shown, the shield is preferably bell-shaped and, to insure a perfectly tight joint around the sleeve litharge cement 26 may be packed around the joint and at the ends of the threads on the extension so that it will be thoroughly packed and squeeze out around the sharp edges. The bushing is made smooth at this point and the small end of shield is made slightly smaller than the diameter of the bushing thereby stretching the shield to a tight fit on the bushing.

To utilize the liquid in a tank or container as a lubricant for the shaft on the inside of the tank and to obviate contamination of the contents of the tank by ordinary lubricants, the extension of the bushing is made to serve as a guide only for the shaft, all weight being taken away. That is to say, the shaft opening is sufficiently large to permit the contents of the tank to enter the extension around the shaft and keep it lubricated. The stuffing box serves as an auxiliary bearing support and the extension of the bushing protects the shaft against deflection when the propeller strikes something heavy.

It is highly important in some cases not to expose certain metals to the chemical action of materials being agitated. Hence, the shaft, the propeller, the bushing and the shield will all be made of a metal or alloy that will resist chemical action of a given material. If the tank or container is not glazed, the shield may be omitted and the ring nut may be used as a lock-nut against the edge of the securing sleeve.

From the foregoing description it will be seen that this invention provides an improved shaft bushing that may readily be inserted in a tank or container from the outside. It enables the user to put in the supporting sleeves whenever desired after the tanks are glazed. The units may be installed in a very short time. The whole bushing may be cast in one piece and machined entirely in a semi-automatic machine. The single piece bushing always supports the motor exactly in proper alignment. The projection of the bushing also guides the shaft when the propeller strikes obstructions and enables a small shaft to be used. A smooth joint between the bushing and the inside of the tank is assured. Moreover, the shaft may be inserted through the tank as far as necessary to produce the best results and at any desired angle to the wall.

Obviously the present invention is not restricted to the particular embodiment thereof herein shown and described. Moreover, it is not indispensable that all the features of the invention be used conjointly, since they may be employed advantageously in various combinations and subcombinations.

What is claimed is:

1. In an agitator installation for tanks and the like; an elongated tapered bearing having its smaller end projecting inwardly through the tank wall and presenting differential screw threads adjacent to the outer end thereof; a screw threaded sleeve arranged in an opening in the wall of the tank cooperating with one set of said differential threads; and a metallic shield adapted to be slipped over the inner end of the bearing and presenting screw threads cooperating with the other set of differential screw threads whereby, when the bearing is screwed in said sleeve, the shield may be pressed against the inner wall of the tank.

2. An agitator installation comprising, in combination; a tank wall having an opening therein; a screw threaded sleeve secured in said opening; an elongated shaft bearing having screw threads cooperating with the screw threads in said sleeve; screw threads of a greater pitch and of smaller diameter on said bearing adjacent to the inner end of the other threads thereof; and a spun metallic, substantially bell-shaped shield having a screw threaded member cooperating with the threads of greater pitch on said bearing and adapted to be clamped against the inner wall of the tank when the bearing is screwed into said sleeve.

3. In an agitator installation for tanks and the like, comprising in combination, a shaft bearing projecting inwardly through the wall of the tank; a substantially bell-shaped shield adapted to be slipped over the inner end of the bearing and be secured to the bearing and adapted to be clamped against the inside of the tank wall.

4. In an agitator installation, an elongated shaft bearing projecting through a wall of the tank and secured thereto; a spun metallic shield surrounding the bearing and presenting a sharp feather edge adapted to conform to and be clamped against the inside of the tank wall to seal the joint; and a packing gland at the outer end of said bearing, and an electric motor positioned outside of said tank, said motor having a shaft in alignment with and rigidly connected to the outer end of the agitator shaft.

5. An agitator installation comprising, in combination; a tank wall having a screw-threaded sleeve secured therein and projecting through the inside of the wall; an elongated bearing having a threaded portion cooperating with the sleeve; other threads of greater pitch and smaller diameter on the bearing adjacent to the inner end of the threads cooperating with the sleeve; a ring nut cooperating with said other threads; a substantially bell-shaped, spun metallic shield secured to said ring nut; and cement between the edges of the shield and bearing and the shield and the inside of the tank wall adapted to close the joints between the shield and said parts.

6. In an agitator installation for tanks, a bearing for the agitator shaft, comprising an elongated bushing having a stuffing box adjacent to the outer end and an extension forming a shaft guide within the tank, said shaft guide being slightly larger than the shaft and open at its inner end whereby the contents of the tank may enter the guide to lubricate the shaft therein.

7. In combination with a tank wall, an agitator shaft bearing extending through the wall; a stuffing box at the outer end of the bearing; means to secure the bearing to the wall; an elongated guide integral with the bearing and extending into the tank; and a thin bell-shaped shield secured to the bearing and adapted to be pressed against and to conform to the wall of the tank to seal the joint between the bearing and said wall, and an electric motor positioned outside of said tank, said motor having a shaft in alignment with and rigidly connected to the outer end of the agitator shaft.

8. In combination with a tank wall having an opening, an agitator shaft bearing including a sleeve secured in the opening; a bearing member screw-threaded into said sleeve and extending into the tank; and a metal shield surrounding the bearing within the tank arranged to be pressed against the inner wall thereof, and an electric motor positioned outside of said tank, said motor having a shaft in alignment with and rigidly connected to the outer end of the agitator shaft.

9. In combination with a tank wall, an elongated bearing member for the shaft extending through the wall; a screw-threaded portion on the bearing member inside of the tank; a ring nut co-operating with the screw-threaded portion; and a yieldable spun sheet metal shield secured to the ring nut and presenting an edge fitted against the wall of the tank, and an electric motor positioned outside of said tank, said motor having a shaft in alignment with and rigidly connected to the outer end of the agitator shaft.

10. A bearing for agitator shafts and the like, comprising an elongated bearing member having provision to be secured within an opening in the tank wall; a shaft extending through the bearing; integral feet cast on the bearing member outside of the wall; and a motor supported by said feet connected to drive said shaft.

In testimony that I claim the foregoing as my own, I have hereto affixed my signature.

WILLIAM H. JACKSON.